United States Patent
Sethi et al.

(10) Patent No.: US 12,164,369 B2
(45) Date of Patent: Dec. 10, 2024

(54) METHOD AND APPARATUS FOR SELECTIVE INPUT/OUTPUT (IO) TERMINAL SAFE-STATING FOR INDEPENDENT ON-CHIP APPLICATIONS

(71) Applicant: NXP B.V., Eindhoven (NL)

(72) Inventors: Ankush Sethi, Austin, TX (US); Rohit Kumar Kaul, Austin, TX (US); Aarul Jain, New Delhi (IN)

(73) Assignee: NXP B.V., Eindhoven (NL)

( * ) Notice: Subject to any disclaimer, the term of this patent is extended or adjusted under 35 U.S.C. 154(b) by 86 days.

(21) Appl. No.: 18/152,217

(22) Filed: Jan. 10, 2023

(65) Prior Publication Data

US 2024/0143429 A1 May 2, 2024

(30) Foreign Application Priority Data

Oct. 29, 2022 (IN) .............................. 202221061697

(51) Int. Cl.
*G06F 11/00* (2006.01)
*G06F 11/07* (2006.01)

(52) U.S. Cl.
CPC ...... *G06F 11/0793* (2013.01); *G06F 11/0724* (2013.01); *G06F 11/0772* (2013.01)

(58) Field of Classification Search
CPC ............. G06F 11/0772; G06F 11/0793; G06F 11/0796; G06F 11/0725; G06F 11/0736–0739; G05B 23/0275; G05B 23/0286–0291
See application file for complete search history.

(56) References Cited

U.S. PATENT DOCUMENTS

| 9,594,356 B2 | 3/2017 | Goepfert et al. |
| 2021/0397502 A1 | 12/2021 | Nautiyal et al. |
| 2023/0079901 A1* | 3/2023 | Hassan .................. G05B 15/02 361/507 |
| 2023/0121675 A1* | 4/2023 | Merker ..................... G06F 1/24 714/23 |

FOREIGN PATENT DOCUMENTS

DE 102020205146 A1 10/2021

OTHER PUBLICATIONS

U.S. Appl. No. 17/879,653 "Dynamic Configuration of Reaction Policies in Virtualized Fault Management System," filed Aug. 2, 2022.

\* cited by examiner

*Primary Examiner* — Marc Duncan (57) ABSTRACT

A system-on-chip (SoC) may include a plurality of terminals and a plurality of terminal controllers. Each terminal controller is configured to selectively disable a terminal. An SoC be configured to execute at least one application. An SoC may include a memory configured to store a plurality of terminal masks. Each terminal mask identifies a subset of the plurality of terminals to be disabled. An SoC may include a fault collection and reaction system configured to transmit, to the plurality of terminal controllers, a fault indication signal in response to an error in a corresponding application. Each terminal controller is further configured to determine, based on a fault indication signal and a value in a terminal mask, whether the terminal corresponding to the terminal controller is to be disabled, and when the terminal corresponding to the terminal controller is to be disabled, disable the terminal.

19 Claims, 7 Drawing Sheets

METHOD AND APPARATUS FOR SELECTIVE INPUT/OUTPUT (IO) TERMINAL SAFE-STATING FOR INDEPENDENT ON-CHIP APPLICATIONS

FIELD OF THE DISCLOSURE

The present disclosure relates generally to management of faults in electronic devices, and, more particularly, to a method and apparatus for selective safe-stating of various input/output (IO) terminals of a system-on-chip (SoC) in response to a fault detection in an application of the SoC.

BACKGROUND

Increasing levels of system integration results in more processor cores and resources being bundled into a single chip. These processor cores may be configured to execute multiple independent applications at the same time. Increasing the number of concurrently operating applications integrated on the chip increases the number of faults that may occur, impacting the functionality of external systems associated with each application.

Modern automotive integrated circuits (IC) use microcontroller safety mechanisms, such as Fault Collection and Control Units (FCCU), to collect faults and errors and to safe-state the IC's IO terminals upon detecting a fault, thereby disabling malfunctioning applications.

Typically, when an FCCU detects a fault within a particular IC, all IO terminals are disabled to prevent faulty or erroneous output of the IC from being transmitted to other applications within the system. As such, traditional fault handling approaches and implementations running within an SoC application respond to a fault generated in a single application within the SoC by safe-stating all of the device's IO terminals. This is a high severity response that shuts down other applications and systems within the SoC that may otherwise be operating correctly and that should not otherwise be affected by an application-specific fault. Consequently, this aggressive fault response can lead to limited device availability, especially if independent applications are running on a single SoC.

SUMMARY

In some aspects, the techniques described herein relate to a system-on-chip (SoC), including: a plurality of terminals; a plurality of terminal controllers, each terminal controller in the plurality of terminal controllers being configured to selectively disable a terminal of the plurality of terminals; a plurality of processor cores, wherein each processor core is configured to execute at least one application; a memory configured to store a plurality of terminal masks, wherein each terminal mask in the plurality of terminal masks is associated with a reaction core and identifies a subset of the plurality of terminals to be disabled; and a fault collection and reaction system coupled to the plurality of processor cores, wherein the fault collection and reaction system includes: a plurality of reaction cores, wherein each reaction core of the plurality of reaction cores is configured to transmit a fault indication signal in response to an error in a corresponding application; and a controller configured to: receive a first fault indication signal from a first reaction core of the plurality of reaction cores; transmit the first fault indication signal to the plurality of terminal controllers, wherein each terminal controller is further configured to: determine, based on the first fault indication signal and a value in a first terminal mask, whether the terminal corresponding to the terminal controller is to be disabled, wherein the first terminal mask is associated with the first reaction core, and when the terminal corresponding to the terminal controller is to be disabled, disable the terminal.

In some aspects, the techniques described herein relate to a system-on-chip (SoC), including: a plurality of terminals; a plurality of terminal controllers, each terminal controller in the plurality of terminal controllers being configured to selectively disable a terminal of the plurality of terminals; a processor configured a plurality of applications; and a fault collection and reaction system configured to: detect a first fault indication for a first application of the plurality of applications, and responsive to the first fault indication, transmit a first signal indicative of the first fault indication to the plurality of terminal controllers to disable an operation of a first subset of the plurality of terminals, wherein the first subset includes terminals that are used by the first application and the first subset does not include terminals that are not used by the first application.

In some aspects, the techniques described herein relate to a method, including: receiving a signal from a reaction core indicating a fault in a first application executed by a processor; and disabling a first subset of a plurality of terminals, wherein the first subset of the plurality of terminals includes terminals used by the first application and does not include terminals that are not used by the first application.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION OF EMBODIMENTS

The following detailed description is merely illustrative in nature and is not intended to limit the embodiments of the subject matter of the application and uses of such embodiments. As used herein, the words "exemplary" and "example" mean "serving as an example, instance, or illustration." Any implementation or embodiment described herein as exemplary, or an example is not necessarily to be construed as preferred or advantageous over other implementations. Furthermore, there is no intention to be bound by any expressed or implied theory presented in the preceding technical field, background, or the following detailed description.

System availability of system-on-chips (SoCs) is of increasing importance as more independent applications and systems rely on single devices to control a number of different independent functions. Conventionally, SoC fault-handling mechanisms handle faults and errors with a one-size-fits-all approach by safe-stating the entire SoC (and, consequently disabling all IO terminals of the SoC) upon detection of a fault. Accordingly, these fault handling approaches effectively cause a fault in a single application to impact (i.e., disable) all other applications running on the SoC, thus potentially disabling applications and functionality that may otherwise operate normally. This is an especially undesirable outcome as more systems rely on a single SoC implementations.

The present disclosure provides systems and methods for selectively safe-stating an SoC's IO terminals associated with faulty applications without impacting the operation of other applications and the IO terminals associated with those applications operating normally. Accordingly, among many other benefits, the present disclosure enables greater system availability and reliability of an SoC.

Figure 1:
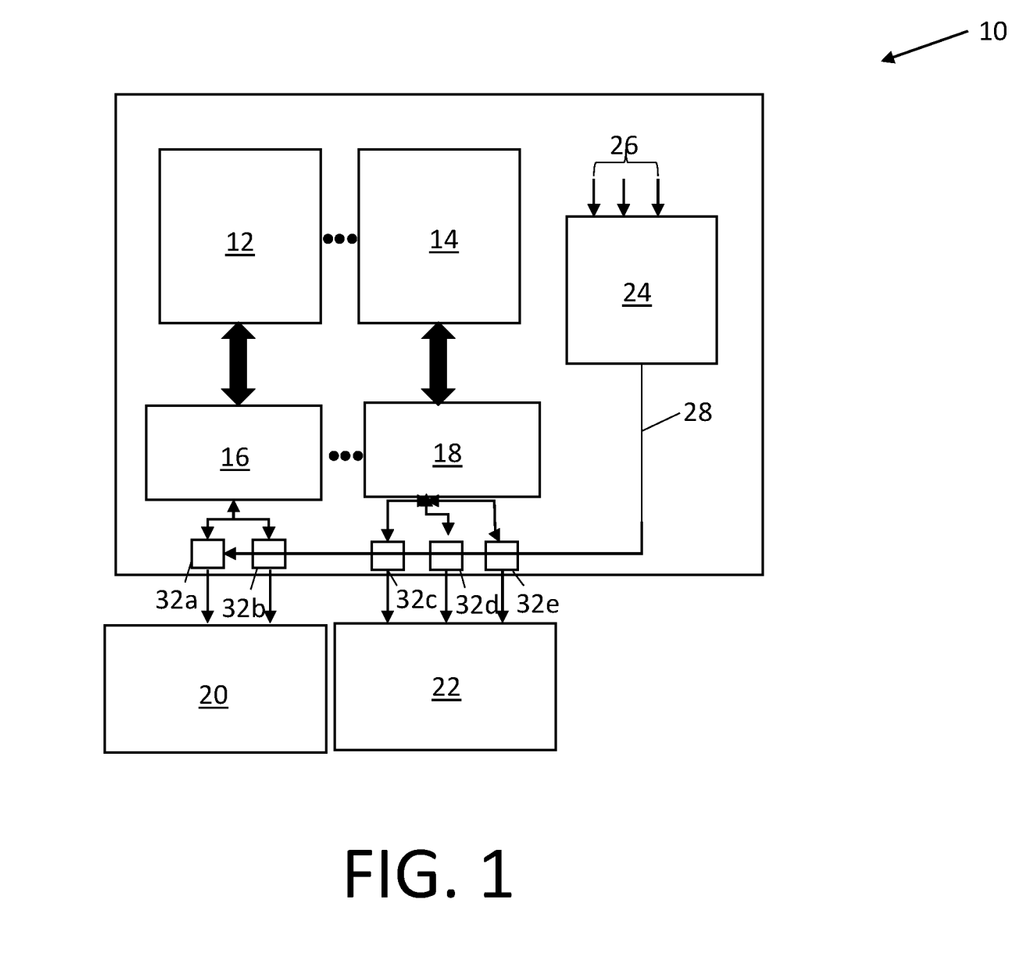
FIG. 1 illustrates a schematic block diagram of a system-on-chip (SoC) with application safe-stating capabilities, in accordance with an embodiment of the present disclosure.

FIG. 1 illustrates a schematic block diagram of a system-on-chip (SoC) 10 with application safe-stating capabilities, in accordance with an embodiment of the present disclosure.

The SoC 10 of FIG. 1 may include a first through $n^{th}$ processor cores 12-14, a first through $n^{th}$ applications 16-18, and a fault collection and reaction system 24. The SoC 10 may be embedded within a larger electronic system (not shown) such as when the SoC 10 operates as part of an automotive control system, an aircraft guidance system, a home security system, an industrial robotic system, or the like. It will be understood by those of ordinary skill in the art that the SoC 10 may include various other circuits and systems (e.g., a fault handling sub-system, a fault detection system, an interrupt handler, or the like) for its operation, which are not shown in order not to obscure the disclosure. Hereinafter, the first through $n^{th}$ processor cores 12-14 are collectively referred to as "a plurality of processor cores 12-14" and the first through $n^{th}$ applications 16-18 are collectively referred to as "a plurality of applications 16-18".

The plurality of processor cores 12-14 are configured to execute the plurality of applications 16-18. For example, when the SoC 10 is embedded within an automotive system, the plurality of applications 16-18 may include an anti-lock braking application, an airbag control application, a data communication subsystem application, an adaptive cruise control application, or the like. It will be understood by those of ordinary skill in the art that the present disclosure may be applicable to any system involving fault responses or where a fault response is warranted, such as safety systems and important systems for operation.

For example, as shown, the first application 16 may control the functionality of a component such as a Controller Area Network (CAN) 20. Similarly, the $n^{th}$ application 18 may control the functionality of a component such as a gate driver in a motor control system 22. Accordingly, each application of the plurality of applications 16-18 may be independent of one another, and control independent and distinct components. In one embodiment, each processor core 12-14 is configured to execute multiple applications concurrently. In another embodiment, one application is executed on multiple processor cores 12-14. The plurality of processor cores 12-14 may be implemented by way of central processing units, processors, microprocessors, electronic control units, microcontroller units, and the like.

The fault collection and reaction system 24 is coupled to the plurality of processor cores 12-14 executing the plurality of applications 16-18 by way of respective fault buses 26. The fault collection and reaction system 24 is further coupled to first through $n^{th}$ terminals 32a-32e (collectively referred to as "a plurality of terminals 32a-32e") by way of a safe-stating signal bus 28. The fault collection and reaction system 24 is configured to receive fault indications (FIs) from the plurality of processor cores 12-14 by way of the fault buses 26. The fault collection and reaction system 24 is configured to output a safe-stating signal transmitted by way of a safe-stating signal bus 28 to the plurality of terminals 32a-32e in response to receipt of a fault indication. A terminal generally refers to an electrical contact by which SoC 10 inputs and outputs (I/O) data. A terminal may be an I/O terminal, a signal pin, a contact pad, and/or a solder ball, to illustrate several types of terminals.

The fault collection and reaction system 24 is configured to receive a fault indication FI in response to occurrence of a fault (e.g., a software fault or a hardware fault) at any of the plurality of processor cores 12-14 or applications 16-18 running thereon. The fault indication FI may be an informational message that includes information pertaining to the fault such as, but not limited to, a type of fault, a time at which that the fault had occurred, and various other parameters required to characterize or reproduce one or more fault conditions. In one embodiment, the fault may occur based on a failure of one of the plurality of processor cores 12-14 executing one of the plurality of applications 16-18 or a failure of one or more of the plurality of applications 16-18. In another embodiment, a fault may occur based on a failure of an operation of one of the plurality of processor cores 12-14.

As shown in FIG. 1, a fault indication FI transmitted by way of one of the plurality of fault buses 26 causes the fault collection and reaction system 24 to transmit a single safe-stating signal 28 to be output to all the terminals 32a-32e of the SoC 10. The safe-stating signal 28 is configured to cause all the terminals 32a-32e to safe-state (i.e., becoming disabled), even if fault occurred in just one application (e.g., either the first application 16 or second application 18) and does not affect other applications running on SoC 10. Accordingly, within SoC 10 a fault in one application or processing core disabled operation of all of the SoC 10's terminals. This decreases the availability of applications that are running properly on the SoC 10. This is especially disadvantageous as SoCs advance to include many more applications being executed on a single SoC. Accordingly, it is advantageous to increase SoC system availability as SoCs become more complex and as many more applications are being executed on a single chip.

Figure 2:
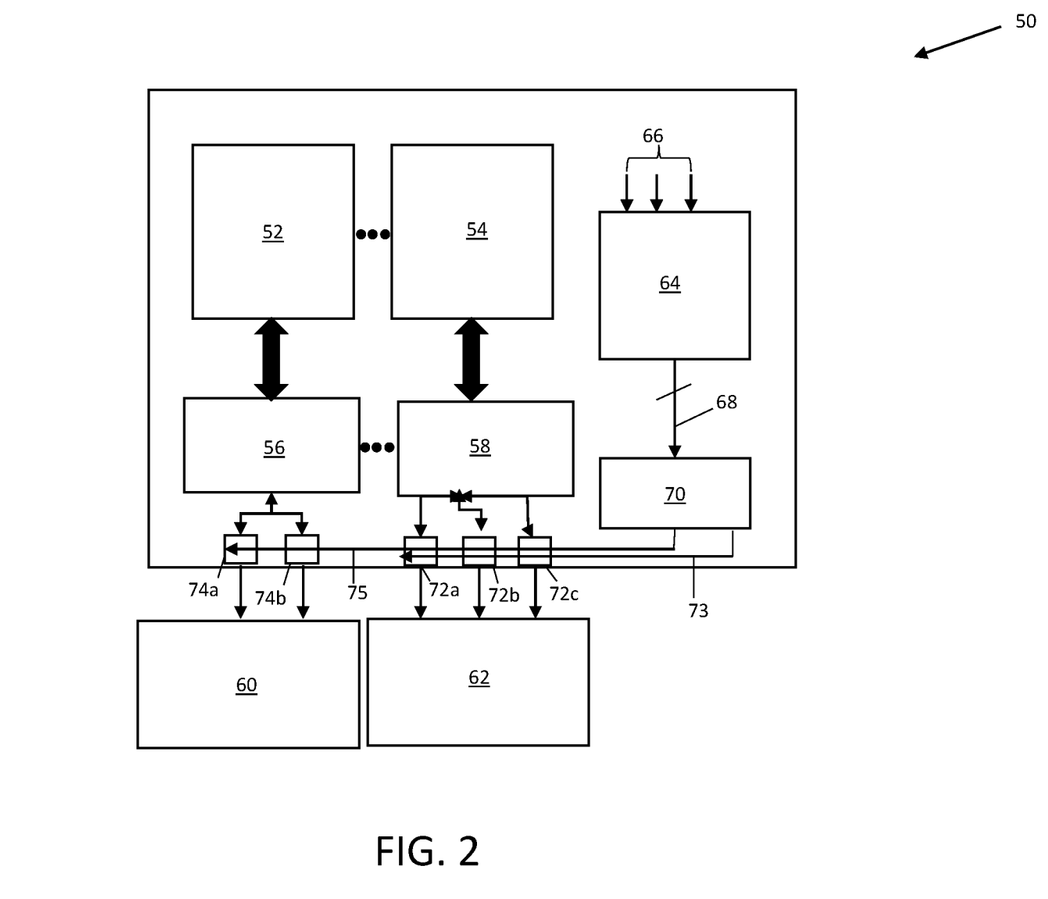
FIG. 2 illustrates a schematic block diagram of an SoC with selective independent application safe-stating capabilities, in accordance with an embodiment of the present disclosure.

In contrast, FIG. 2 illustrates a schematic block diagram of an SoC 50 with selective independent application safe-stating capabilities, in accordance with an embodiment of the present disclosure. Selective independent application safe-stating capabilities include, for example, selectively disabling only those terminals associated with faulty applications, while allowing the SoC 50's terminals associated with properly functioning applications to operate as normal. In the present disclosure, a terminal generally refers to an electrical contact by which SoC 50 inputs and outputs (I/O) data. A terminal may be an I/O terminal, a signal pin, a contact pad, and/or a solder ball, to illustrate several types of terminals.

As shown, the SoC 50 includes a plurality of processor cores 52-54 executing a plurality of applications 56-58 that control the functionality of various external systems and components 60-62. The SoC 50 includes a fault collection and reaction system 64 coupled to the plurality of processor cores 52-54 executing the plurality of applications 56-58 by way of respective fault buses 66. The fault collection and reaction system 64 is configured to receive fault indications FIs from the plurality of processor cores 52-54 by way of the fault buses 66.

Along with the fault indication FI, the fault collection and reaction system 64 is configured to receive an application ID (e.g., a domain identifier D_ID) that indicates an application (e.g., one of the plurality of applications 56-58) associated with the fault. For example, the fault collection and reaction system 64, along with the fault indication FI, receives first application ID D_ID '0' when the fault is associated with first application 56. The fault collection and reaction system 64 is configured to respond to the fault indication FI with an appropriate reaction R0-Rm that either enables recovery from the fault, or safe-states (e.g., disables) components associated with a faulty application.

In other words, the fault collection and reaction system 64 provides fault collection and reaction capability to the SoC 50 for controlling and collecting various faults reported by the plurality of processor cores 52-54. The fault collection and reaction system 64 responds with different reactions for different faults. Further, the fault collection and reaction system 64 may respond with different reactions to the same faults in different applications 56-58.

The SoC 50 may include first through $n^{th}$ terminals 72a-72c and 74a-74b (e.g., a plurality of terminals 72a-72c and 74a-74b), which may be subsets of terminals assigned to or utilized by distinct applications. The plurality of terminals 72a-72c and 74a-74b may include signal pins, contact pads, and/or solder balls, for example.

As shown, for example, a first subset of terminals 74a-74b may correspond to the first application 56 and may be configured to control the functions of, for example, a CAN. As shown, for example, a second subset of terminals 72a-72c may correspond to the second application 58 and may be configured to control the functions of, for example, a gate driver in a motor system 62. It will be understood by those of ordinary skill in the art that the SoC 50 may include any number of terminals configured to control the functions of any number of external systems and components.

As shown in FIG. 2, an exemplary response of the fault collection and reaction system 64 includes one or more safe-stating reactions transmitted by way of a safe-stating signal bus 68 and through a selective safe-stating pathway 70 to a plurality of terminal controllers (not shown), wherein each terminal controller of the plurality of terminal controllers is coupled to and configured to control an operation of a single terminal of the plurality of terminals 72a-72c and 74a-74b.

For example, based on one or more safe-stating reactions, the selective safe-stating pathway 70 may output a first plurality of values 75 (e.g., Boolean values) to a plurality of terminal controllers (not shown) corresponding to a first subset of terminals 74a-74b and a second plurality of values 73 (e.g., Boolean values) to a plurality of terminal controllers (not shown) corresponding to a second subset of terminals 72a-72c. For example, each value of the first plurality of values 75 and second plurality of values 73 may be either one of a high '1' or low '0' Boolean value. The high '1' value output to a terminal controller represents a determination that the terminal be impacted (e.g., disabled or safe-stated), whereas the low '0' value output represents a determination that the terminal is not to be impacted.

In an exemplary embodiment, when the first application 56 is faulty and the second application 58 is being properly executed, the first plurality of values output by the selective safe-stating pathway 70 results in the controllers disabling or safe-stating the first subset of terminals 74a-74b, while the second plurality of values output by the selective safe-stating pathway 70 does not result impact the second subset of terminals 72a-72c. Accordingly, and as will be described and shown in further detail with reference to FIGS. 5 and 6, the selective safe-stating pathway 70 enables safe-stating only those terminals assigned to a faulty application, increasing overall system availability.

The selective safe-stating pathway 70 and terminal controllers are described and shown in further detail in reference to FIGS. 5 and 6 below.

Figure 3:
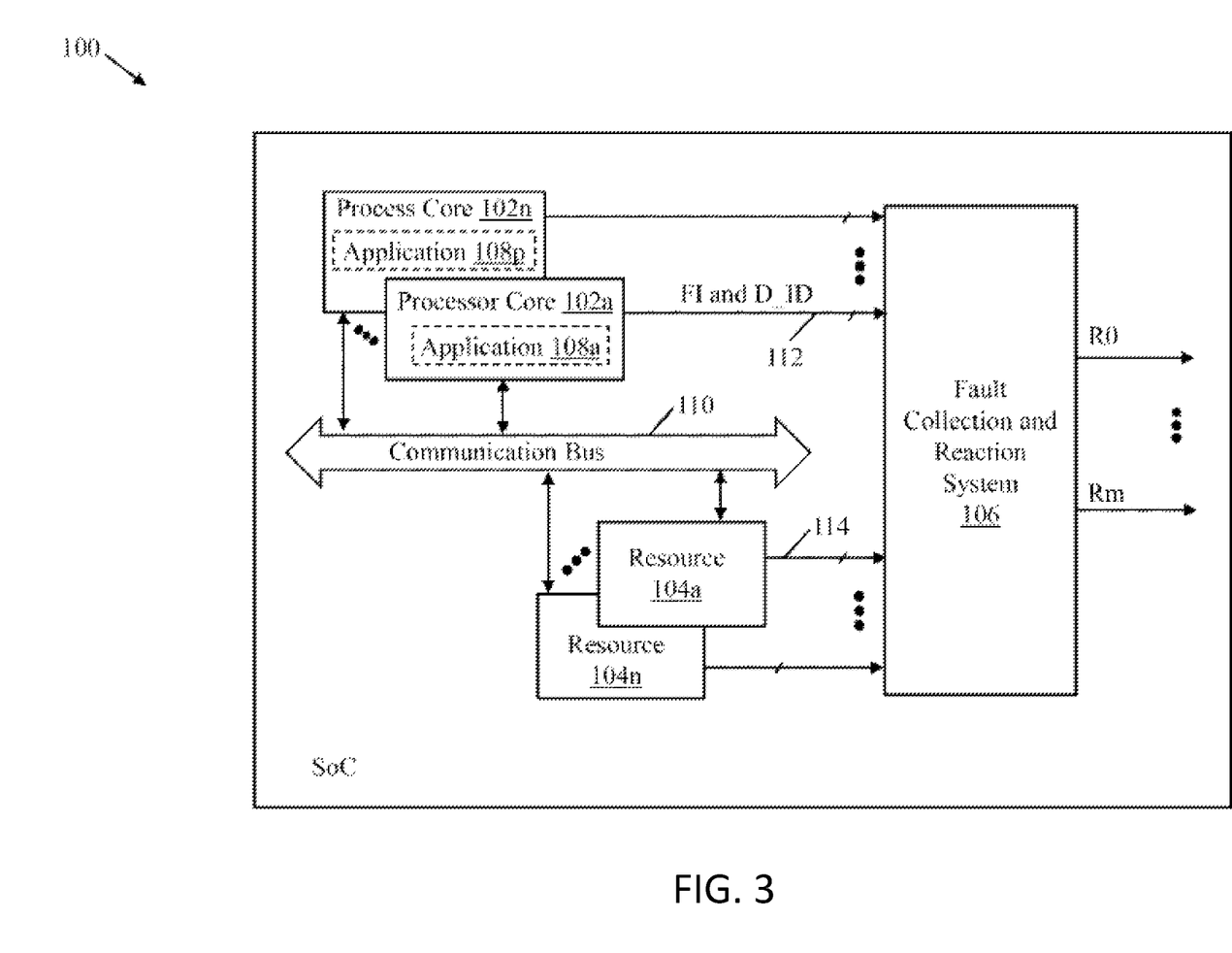
FIG. 3 illustrates a schematic block diagram of an SoC with fault collection and reaction capabilities in accordance with an embodiment of the present disclosure.

FIG. 3 illustrates a schematic block diagram of a system-on-chip (SoC) 100 (e.g., SoC 50, FIG. 2) with fault collection and reaction capabilities, in accordance with an embodiment of the present disclosure.

The SoC 100 includes first through $n^{th}$ processor cores 102a-102n, first through $n^{th}$ resources 104a-104n, and a fault collection and reaction system 106. The SoC 100 can be embedded within an electronic system (not shown) such as an automotive system, an aircraft guidance system, a home security system, an industrial robotic system, or the like. It will be understood by those of ordinary skill in the art that the SoC 100 includes various other circuits and systems (e.g., a fault handling sub-system, a fault detection system, an interrupt handler, or the like) for its operation, which are not shown in order not to obscure the disclosure. Hereinafter, the first through $n^{th}$ processor cores 102a-102n are collectively referred to as "a plurality of processor cores 102a-102n" and the first through $n^{th}$ resources 104a-104n are collectively referred to as "a plurality of resources 104a-104n".

The plurality of processor cores 102a-102n are configured to execute first through $p^{th}$ applications 108a-108p. Hereinafter, the first through $p^{th}$ applications 108a-108p are collectively referred to as "a plurality of applications 108a-108p". For example, when the SoC 100 is embedded within an automotive system, the plurality of applications 108a-108p may include an anti-lock braking application, an airbag control application, an adaptive cruise control application, or the like. In one embodiment, each processor core 102a-102n is configured to execute multiple applications, concurrently. In another embodiment, one application is executed on multiple processor cores 102a-102n. The plurality of processor cores 102a-102n may be implemented by way of central processing units, processors, microprocessors, electronic control units, microcontroller units, and the like. Each application 108a-108p is associated with a corresponding application ID (e.g., domain identifier). For example, the first application 108a being executed by the first processor core 102a is associated with a first application ID D_ID '0' and the second application 108b being executed by the second processor core 102b is associated with a second application ID D_ID '1'.

The plurality of resources 104a-104n are accessed by the plurality of processor cores 102a-102n for executing the plurality of applications 108a-108p. The execution of the plurality of applications 108a-108p includes a plurality of transactions between the plurality of resources 104a-104n and the plurality of processor cores 102a-102n. For example, for executing the first application 108a, the first processor core 102a may be required to transact with the first resource 104a. Each transaction initiates one or more subsequent operations at the corresponding resource 104a-104n. Examples of the plurality of resources 104a-104n include one or more hardware schedulers and controllers, a clocking circuit, one or more accelerators, a memory such as a static Random Access Memory (SRAM), a memory controller, one or more communication peripherals, or the like.

The plurality of resources 104a-104n are coupled to the plurality of processor cores 102a-102n by way of a communication bus 110. In other words, the plurality of processor cores 102a-102n transact with the plurality of resources 104a-104n by way of the communication bus 110. The communication bus 110 is a communication interface such as, but not limited to, an advanced microcontroller bus architecture (AMBA), an advanced high-performance bus (AHB), an advanced peripheral bus (APB), an and advanced extensible interface (AXI) bus.

The fault collection and reaction system 106 (e.g., the fault collection and reaction system 64 of FIG. 2) is coupled to the plurality of processor cores 102a-102n and the plurality of resources 104a-104n by way of respective fault buses 112 and 114. The fault collection and reaction system 106 is configured to receive fault indications FIs from the plurality of processor cores 102a-102n and the plurality of resources 104a-104n by way of the fault buses 112 and 114. The fault collection and reaction system 106 receives a fault indication FI in response to occurrence of a fault (e.g., a software fault or a hardware fault) at any of the plurality of processor cores 102a-102n and the plurality of resources 104a-104n. The fault indication FI is an information message that includes information pertaining to the fault such as, but not limited to, a type of fault, a time at which that the fault had occurred, and various other parameters required to characterize or reproduce one or more fault conditions. In one embodiment, the fault may occur based on a failure of one of the plurality of transactions between the plurality of processor cores 102a-102n and the plurality of resources 104a-104n.

For example, a fault may occur based on a failure of a first transaction performed between the first processor core 102a and the first resource 104a for executing the first application 108a. In another embodiment, a fault may occur based on a failure of an operation of one of the plurality of resources 104a-104n subsequent to a transaction. For example, a fault may occur based on a failure of an operation of the first resource 104a subsequent to the first transaction. Along with the fault indication FI, the fault collection and reaction system 106 is configured to receive an application ID (e.g., a domain identifier D_ID) that indicates an application (e.g., one of the plurality of applications 108a-108p) associated with the fault. For example, the fault collection and reaction system 106, along with the fault indication FI, receives the first application ID D_ID '0' when the fault is associated with the first application 108a. The fault collection and reaction system 106 is configured to respond to the fault indication FI with an appropriate reaction R0-Rm that enables recovery from the fault.

In other words, the fault collection and reaction system 106 provides fault collection and reaction capability to the SoC 100 for controlling and collecting various faults reported by the plurality of processor cores 102a-102n and the plurality of resources 104a-104n. The fault collection and reaction system 106 responds with different reactions for different faults. Further, the fault collection and reaction system 106 responds with different reactions to the same faults in different applications 108a-108p. Various components of the fault collection and reaction system 106 are described in FIG. 4.

Figure 4:
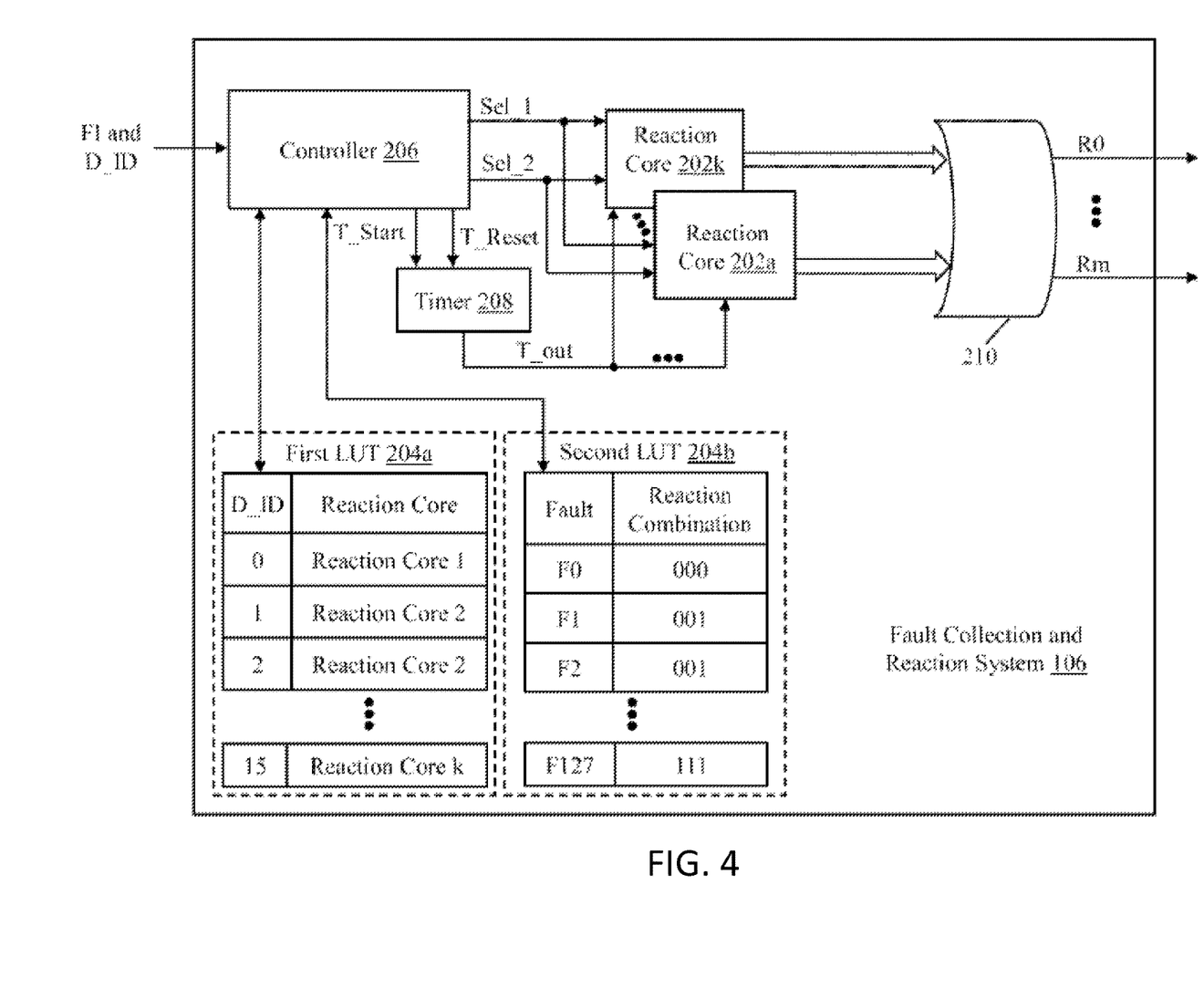
FIG. 4 illustrates a schematic block diagram of a fault collection and reaction system of the SoC of FIG. 3, in accordance with an embodiment of the present disclosure.

FIG. 4 illustrates a schematic block diagram of the fault collection and reaction system 106 (e.g., the fault collection and reaction system 64 of FIG. 2), in accordance with an exemplary embodiment of the present disclosure.

The fault collection and reaction system 106 includes first through $k^{th}$ reaction cores 202a-202k, first and second look-up tables (LUTs) 204a and 204b, a controller 206, a timer 208, and an output device 210. Hereinafter, the first through $k^{th}$ reaction cores 202a-202k are collectively referred to as "a plurality of reaction cores 202a-202k".

The plurality of reaction cores 202a-202k are coupled to the controller 206, the timer 208, and the output device 210. Each reaction core 202a-202k is assigned to at least one of the plurality of applications 108a-108p. In one example, the first reaction core 202a is assigned to the first application 108a and the second reaction core 202b is assigned to the second and third applications 108b and 108c. Based on a fault indication FI and an application ID D_ID received by the fault collection and reaction system 106 one of the plurality of reaction cores 202a-202k is selected to respond to the fault indication FI with an appropriate reaction R0-Rm. In other words, the reaction R0-Rm for handling the fault is output by one of the plurality of reaction cores 202a-202k that is selected. Inclusion of multiple reaction cores 202a-202k in the fault collection and reaction system 106 enables the fault collection and reaction system 106 to respond with different reactions to the same fault associated with different applications 108a-108p.

The first LUT 204a is coupled to the controller 206 and configured to store therein a first mapping between the plurality of reaction cores 202a-202k and corresponding plurality of application IDs (e.g., domain identifiers). For example, as illustrated by a first row of the first LUT 204a, the first application ID D_ID '0' is mapped to the first reaction core 202a. Similarly, mapping between other application IDs D_IDs '1'-'15' and remaining reaction cores 202b-202k is illustrated by remaining rows of the first LUT 204a. When a reaction core (e.g., one of the plurality of reaction cores 202a-202k) is mapped to an application ID D_ID, the reaction core is designated to respond to those fault indications FIs that pertain to the mapped application ID D_ID. Thus, as per the first mapping in the first LUT 204a, the first reaction core 202a is designated to respond to fault indications FIs that pertain to the first application ID D_ID '0'. For the sake of brevity, the first LUT 204a is shown to include the first mapping between 16 application IDs D_IDs and 'k' reaction cores. However, in actual implementation a count of reaction cores and application IDs D_IDs may vary as per system requirement of the electronic system in which the SoC 100 is embedded.

The second LUT 204b is coupled to the controller 206 and configured to store therein a second mapping between a plurality of faults (e.g., faults F0-F127) and a set of reaction combinations. The plurality of faults include those faults that are likely to occur on the SoC 100. For example, as illustrated in a first row of the second LUT 204a, a first fault 'F0' is mapped to a first reaction combination '000'. Similarly, other faults F1-F127 are mapped to remaining reaction combinations. For the sake of brevity, the second LUT 204b is shown to include the second mapping between eight reaction combinations and 128 faults. However, in actual implementation a count of reaction combinations and faults may vary as per system configuration of the electronic system.

The controller 206 is coupled to the plurality of reaction cores 202a-202k, the first and second LUTs 204a and 204b, and the timer 208. The controller 206 is configured to receive the fault indication FI on one of the fault buses 112 and 114 when one of the plurality of faults occurs on the SoC 100. The controller 206 is further configured to receive one of the plurality of application IDs D_IDs along with the fault indication FI. The received application ID D_ID is indicative of one of the plurality of applications 108a-108p that is associated with the reported fault (e.g., the first fault F0).

The controller 206 is further configured to select one of the plurality of reaction cores 202a-202k that is mapped to the received application ID D_ID in the first LUT 204a and one of the plurality of reaction combinations that is mapped to the indicated fault in the second LUT 204b. The controller 206 is further configured to generate and provide first and second selection signals Sel_1 and Sel_2 to the plurality of reaction cores 202a-202k. The first selection signal Sel_1 is generated to indicate the selection of one of the plurality of reaction cores 202a-202k, and the second selection signal Sel_2 is generated to indicate the selection of one of the plurality of reaction combinations. The controller 206 is further configured to generate and provide a start signal T_Start to the timer 208 upon receiving the fault indication FI. The start signal T_Start indicates a timer value associated with the fault reported by the fault indication FI. The controller 206 is further configured to generate and provide a reset signal T_Reset to the timer 208 when the fault is handled.

The timer 208 is a programmable timer that is configured to receive the start signal T_Start from the controller 206 and run based on the timer value indicated by the start signal T_Start. The timer 208 is further configured to generate and provide a time-out signal T_Out to the plurality of reaction cores 202a-202k. The time-out signal T_Out is by default at a first logic state (e.g., logic low) and transitions from the first logic state to a second logic state (e.g., logic high) when the timer value expires (i.e., when the timer 208 times-out). The timer 208 is configured to receive the reset signal T_Reset from the controller 206 and reset to a default state. In other words, the timer 208 resets when the fault is handled.

The output device 210 has a plurality of input terminals that are coupled to the plurality of reaction cores 202a-202k and a plurality of output terminals that are coupled to various reaction buses (not shown) on the SoC 100. The output device 210 is configured to receive the reaction R0-Rm outputted by one of the plurality of reaction cores 202a-202k and provide the received reaction R0-Rm, by way of the reaction buses, to various components and modules on the SoC 100, for example, the plurality of processor cores 102a-102n, the plurality of resources 104a-104n, an interrupt controller (not shown), a reset generator (not shown), a power management and control system (not shown), a fault handler (not shown), or the like.

In operation, when one of the plurality of faults occurs on the SoC 100, the controller 206 receives a fault indication FI that reports the fault and one of the plurality of application IDs D_ID that is associated with the fault. In a non-limiting example, it is assumed that the fault indication FI is received in response to occurrence of the first fault F0 associated with the first application 108a. In such a scenario, the received domain identifier D_ID is '0' associated the first application 108a.

The controller 206 looks-up the first LUT 204a and selects the first reaction core 202a that is mapped to the received domain identifier D_ID '0' in the first LUT 204a.

Further, the controller 206 looks-up the second LUT 204b and selects the first reaction combination '000' that is mapped to the first fault F0 in the second LUT 204b. The controller 206 generates the first and second selection signals Sel_1 and Sel_2 to indicate the selection of the first reaction core 202a and the first reaction combination '000', respectively.

The controller 206 provides the first and second selection signals Sel_1 and Sel_2 to the plurality of reaction cores 202a-202k. Based on the received fault indication FI, the controller 202 further generates and provides the start signal T_Start to the timer 208. The timer 208 receives the start signal T_Start and runs based on the timer value indicated by the start signal T_Start. The timer 208 further generates and provides the time-out signal T_Out that is at the first logic state (i.e., logic low) to the plurality of reaction cores 202a-202k.

Figure 5:
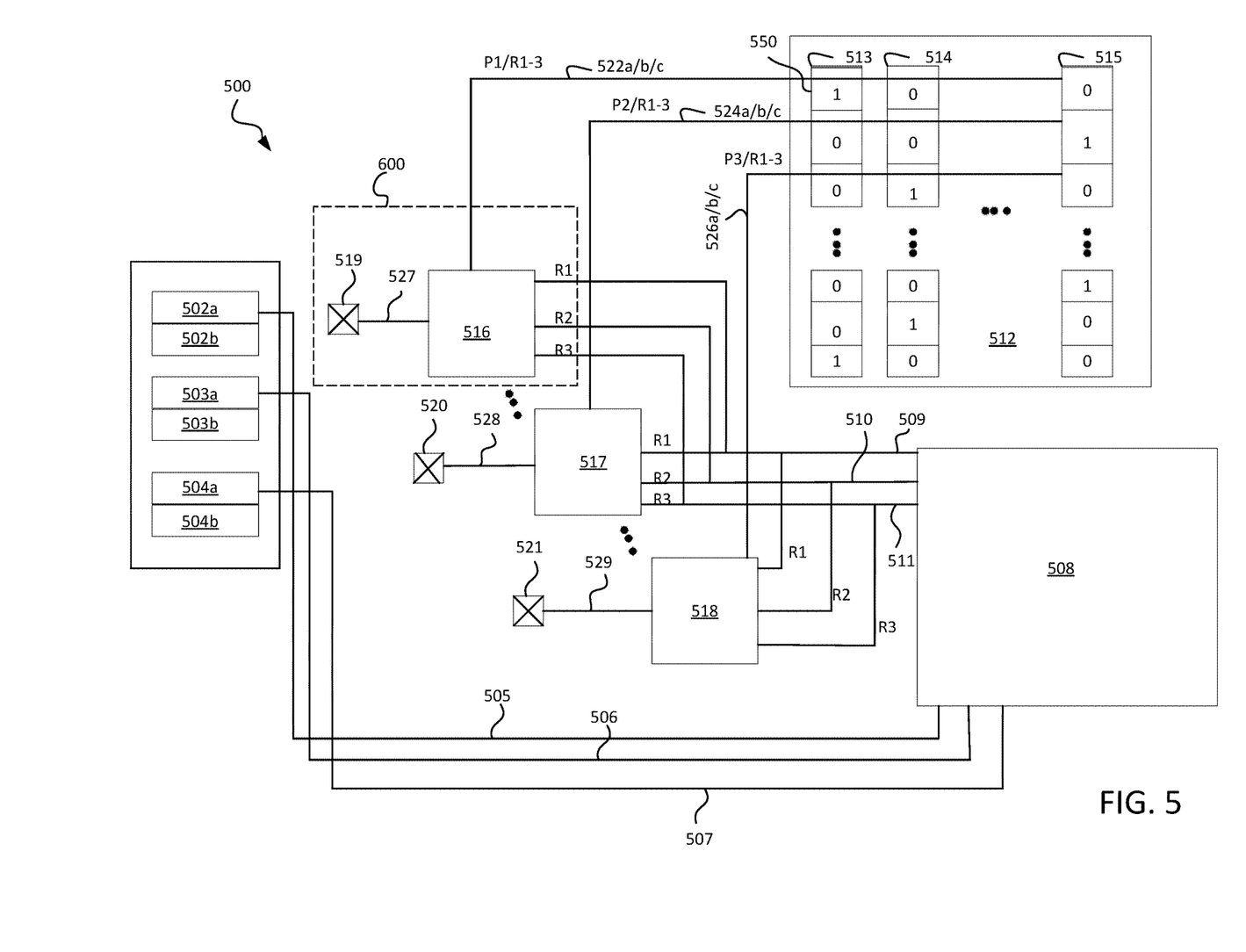
FIG. 5 illustrates a schematic block diagram of the SoC of FIG. 2 with a fault collection and reaction system having selective terminal safe-stating capabilities, in accordance with an embodiment of the present disclosure.

FIG. 5 illustrates a schematic block diagram of components of an SoC 500 (e.g., the SoC of FIG. 2) with a fault collection and reaction system having selective terminal safe-stating capabilities (e.g., for example, the selective safe-stating control system of FIG. 2), in accordance with an embodiment of the present disclosure.

As shown in FIG. 5, the SoC 500 includes a first application 502a, a second application 503a, and a third application 504a (e.g., a "plurality of applications 502a-504a). Each application of the plurality of applications 502a-504a is executed by a corresponding processing core of a plurality of processor cores 502b-504b. The SoC 500 further includes a fault collection and reaction system 508. The fault collection and reaction system 508 may be, for example, a Fault Collection and Control Unit (FCCU).

The fault collection and reaction system 508 (e.g., the fault collection and reaction system 64 of FIG. 2; e.g., the fault collection and reaction system 106 of FIGS. 3 and 4) is coupled to the plurality of processing cores 502b-504b by way of a plurality of fault buses 505-507. The fault collection and reaction system 508 may receive a plurality of signals including fault indications FI by way of the plurality of fault buses 505-507. As shown, each processing core executing an application transmits one fault indication FI to the fault collection and reaction system 508 by way of at least one fault bus of the plurality of fault buses 505-507. For example, the first processing core 502b executing the first application 502a can transmit a first fault indication FI signal via first fault bus 505, the second processing core 503b executing the second application 503a can transmit a second fault indication FI signal via second fault bus 506, and the third processing core 504b executing the third application 504a can transmit a third fault indication FI signal via third fault bus 507 to the fault collection and reaction system 508.

Referring to FIG. 5, and as described with reference to FIGS. 2-4, above, the fault collection and reaction system 508 includes a plurality of reaction cores (not shown) and selects one of the plurality of reaction cores to respond to a received fault indication FI with an appropriate reaction R0-Rm. In one embodiment, each application of the plurality of applications 502a-504a is associated with at least one fault bus of the plurality of fault buses 505-507. Similarly, each reaction R0-Rm is associated with one reaction bus of a plurality of reaction buses 509-511. As shown, the fault collection and reaction system 508 outputs a first reaction signal by way of a first reaction bus 509. The fault collection and reaction system 508 outputs a second reaction signal by way of a second reaction bus 510. The fault collection and reaction system 508 outputs a third reaction signal by way of a third reaction bus 511.

The SoC 500 may include first through $n^{th}$ plurality of terminal controllers 516-518. The fault collection and reaction system 508 is coupled to the plurality of terminal controllers 516-518 by way of the plurality of reaction buses 509-511. Each terminal controller of the plurality of terminal controllers 516-518 is coupled to one of the terminals of the plurality of terminals 519-521 by way of a communication bus 527-529. Each terminal controller of the plurality of terminal controllers 516-518 is configured to selectively enable or disable its connected terminal 519-521.

In the event of an error, an appropriate reaction signal is transmitted by the fault collection and reaction system 508 to all terminal controllers 516-518 by way of the appropriate reaction bus 509-511. Upon receipt of the reaction signal, each terminal controller 516-518 can determine, based on the reaction signal, whether to disable its corresponding terminal.

Although in the example of FIG. 5, only three terminals and three terminal controllers are shown, it will be understood by those of ordinary skill in the art that the SoC may include any number of terminals and terminal controllers. Some SoCs, for example, may include fifty or more terminals, in which case the SoC, configured in accordance with the present disclosure, would include a corresponding number of terminal controllers. Likewise, although three reaction buses are shown, it will be understood by those of ordinary skill in the art that the SoC may include any number of reaction buses.

In the present embodiment, each reaction signal R0-Rm is represented by a high logic signal being transmitted on the respective reaction bus 509-511 for that particular reaction. In their default states, such as when a particular reaction signal R0-Rm is not being transmitted, the various reaction buses 509-511 will be set to a logic low state. It will be readily appreciated, that alternative embodiments may be implemented in which a reaction signal R0-Rm default state (e.g., where there is no fault) is a high logic value, and a triggered reaction signal R0-Rm is generated by transmitting a low logic value on the associated reaction bus 509-511. To illustrate, in the event of a fault causing the first reaction signal R0 (associated with reaction bus 509) to be generated, the first reaction signal R0 is transmitted (e.g., by setting a high logic value on reaction bus 509) to each one of the plurality of terminal controllers 516-518.

As further shown in FIG. 5, the SoC 500 stores first to $n^{th}$ plurality of terminal masks 513-515 (e.g., a "plurality of terminal masks"). Each terminal mask stored in memory 512 is a data record that specifies which terminals are enabled (i.e., a first subset of the terminals) and which terminals are to be disabled (i.e., a second subset of the terminals) for a particular reaction. As such, each terminal mask stored in memory 512 is associated with a particular reaction that is generated by a particular reaction core.

In the event of an error, therefore, each terminal controller 516-518 is configured to receive at least two input signals—first, the applicable reaction signal R0-Rm, and second, an indication received from the terminal masks of memory 512 of whether the terminal controller's terminal should be disabled or enabled in the event of that particular reaction. As shown, memory 512 of the SoC 500 stores first to $n^{th}$ plurality of terminal masks 513-515. In the depicted example, memory 512 may include a first terminal mask 513, a second terminal mask 514, and a third terminal mask 515.

Each terminal mask of the plurality of terminal masks 513-515 includes a number of values equal to a number of terminals in the plurality of terminals 516-518, wherein each value in the plurality of terminal masks 513-515 is associated with a particular status of the corresponding terminals (e.g., disabled or enabled). In one embodiment, each value may be binary number representing an analog voltage. In another embodiment, each value may be a Boolean value, such as a high '1' value or low '0' value. As shown, values in the first terminal mask 513 that are associated with terminals in a first subset of terminals have a first Boolean value (e.g., '1') and values in the first terminal mask 513 that are associated with terminals that are not in the first subset of terminals have a second Boolean value (e.g., '0'). Similarly, values in the second terminal mask 514 that are associated with terminals in a first subset of terminals have a first Boolean value (e.g., '0') and values in the second terminal mask 514 that are associated with terminals that are not in the first subset of terminals have a second Boolean value (e.g., '0' to a second subset and '1' to a third subset). Similarly, values in the third terminal mask 515 that are associated with terminals in a first subset of terminals have a first Boolean value (e.g., '0') and values in the third terminal mask 515 that are associated with terminals that are not in the first subset of terminals have a second Boolean value (e.g., '1' to a second subset and '0' to a third subset).

In an embodiment of the present disclosure, and as will be further discussed with reference to FIG. 6, the plurality of terminal controllers 516-518 are configured to determine whether to disable their corresponding terminals based on a plurality of input parameters. As previously discussed, one parameter may be logic states of the reaction signals R0-Rm transmitted by way of the plurality of reaction buses 509-511. Another parameter may be the value stored on the memory 512 and transmitted to the appropriate terminal controller by way of a plurality of mask buses 522a-c/524a-c/526a-c. As previously discussed, the stored value may be associated with a particular terminal or terminal subset and is identified by the memory based on a given reaction. For instance, with respect to a first reaction, each terminal controller receives (1) the first reaction signal (i.e., a high logic value on that reaction signal's reaction bus); and (2) a corresponding mask value from the first terminal mask 513 for that reaction and that terminal.

In a specific example, referring to the first terminal mask 513 as depicted in FIG. 5, the value 550 associated with the first terminal 519 is a Boolean value of '1'. This value is transmitted to the first terminal controller 516 by way of a first terminal bus 522a/b/c. The first terminal bus 522a/b/c may be configured to transmit to the first terminal controller 516 values from any number of terminal masks based on any number of reactions. As shown, the value '1' transmitted from the first terminal mask 513 is transmitted by first terminal bus 522a. The value '0' transmitted from the second terminal mask 514 is transmitted by first terminal bus 522b. The value '0' transmitted from the second terminal mask 515 is transmitted by first terminal bus 522c.

It will be understood by those skilled in the art that the principles described above apply to the second terminal controller 517, second terminal mask 514, and second terminal bus 524a/b/c, and third terminal controller 518, third terminal mask 515, and third terminal bus 526a/b/c.

As will be described in further detail below, if both inputs to a terminal controller for a particular reaction signal indicate that the corresponding terminal should be safe-stated (e.g., both inputs are 'high 1'), then the terminal controller disables its corresponding terminal (e.g., by connecting that terminal to a high impedance value—such as by disconnecting the terminal from the remainder of SoC 500). If those conditions are not met, then the terminal controller does not disable its corresponding terminal.

As will be discussed with reference to FIG. 6, a selective safe-stating control system 600 has been devised to map a safe-stating reaction to at least one terminal assigned to an independent application having a fault condition (e.g., a selective safe-stating control system that enables a terminal controller to determine whether to safe-state a terminal).

Figure 6:
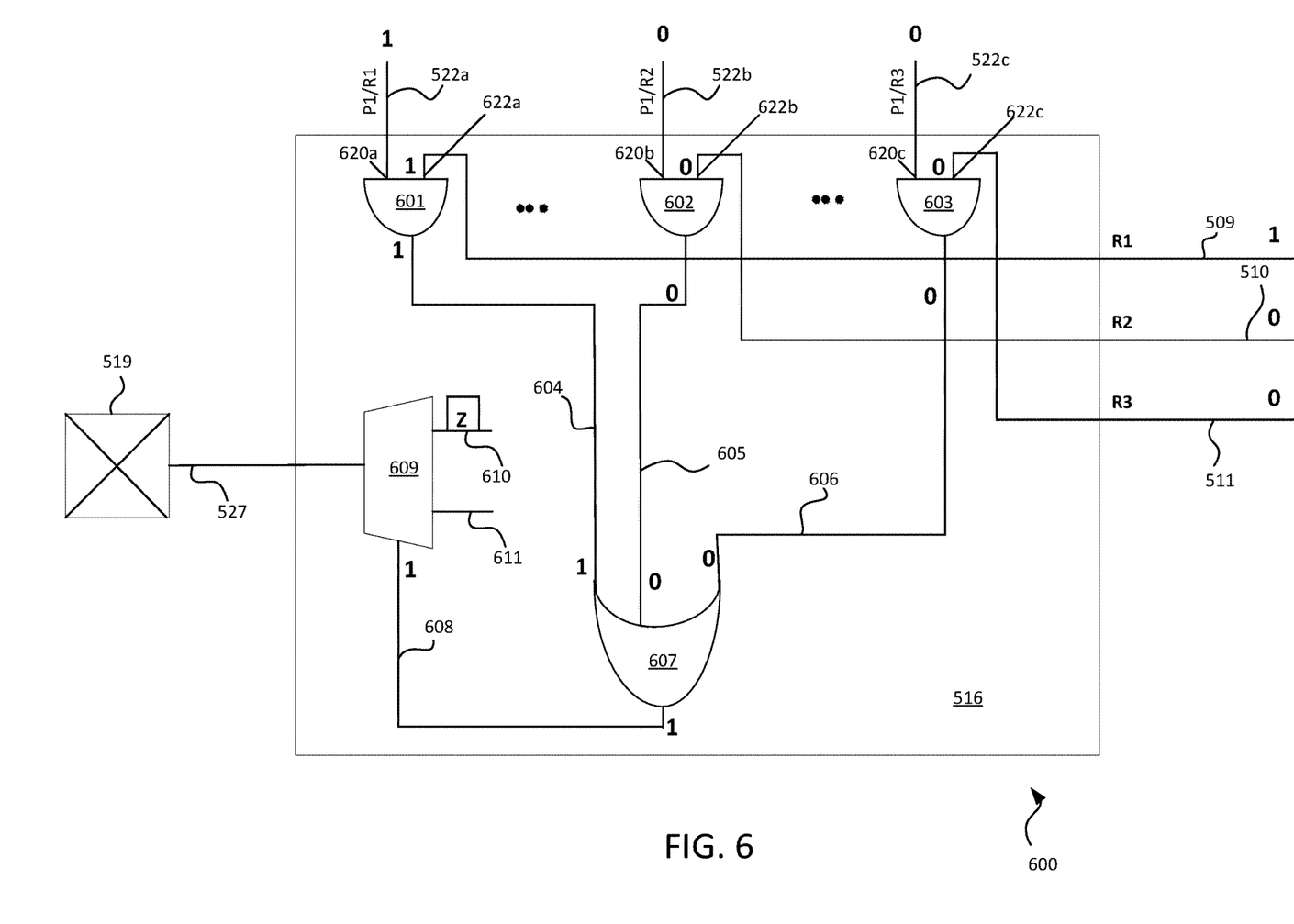
FIG. 6 illustrates a schematic block diagram of a portion of a selective safe-stating pathway on the SoC of FIG. 5, in accordance with an embodiment of the present disclosure.

FIG. 6 is a block diagram depicting functional components of a terminal controller and connected terminal in accordance with the present disclosure. In this specific example, FIG. 6 depicts functional components of the first terminal controller 516 and first terminal 519 of FIG. 5, though it should be understood that the configuration depicted in FIG. 6 may apply to any terminal controller and terminals of the present disclosure.

As shown in FIG. 6, the selective safe-stating control system 600 is on the first terminal controller 516. The selective safe-stating control system 600 includes first through $n^{th}$ logic gates 601-603 and 607 (e.g., a plurality of logic gates 601-603 and 607). The plurality of logic gates may be, for example, a plurality of AND gates 601-603 and an OR gate 607. The number of AND gates in selective safe-stating pathway 600 is determined by the number of reactions the terminal controller 516 receives. Specifically, each AND gate includes a first input 620*a/b/c* coupled to a memory (e.g., memory 512 of FIG. 5) by a terminal mask bus 522*a/b/c*. Each AND gate 601-603 also includes respective second inputs 622*a/b/c* coupled to a fault collection and reaction system (e.g., fault collection and reaction system 508, FIG. 5) by a reaction bus 509-511.

In this configuration, terminal controller 516 is configured to receive three reaction signals transmitted via the three reaction buses 509-511. Furthermore, the first terminal controller 516 is configured to receive three terminal mask values from three terminal masks, wherein the values are transmitted by way of the first terminal mask bus 522*a*/522*b*/522*c*.

As shown, there are three AND gates 601-603 associated with the three reaction buses 509-511. A first reaction signal (if transmitted) is received by AND gate 601 at the second input 622*a* of AND gate 601. A second reaction signal (if transmitted) is received by AND gate 602 at the second input 622*b* of AND gate 602. A third reaction signal (if transmitted) is received by AND gate 603 at the second input 622*c* of AND gate 603.

Likewise, a first mask value (i.e., indicating whether the terminal should be disabled when the first reaction signal is transmitted) is received from memory by AND gate 601 at the first input 620*a*. A second mask value (i.e., indicating whether the terminal should be disabled when the second reaction signal is transmitted) is received by the second AND gate 602 at first input 620*b*. A third mask value (i.e., indicating whether the terminal should be disabled when the third reaction signal is transmitted) is received AND gate 603 at the first input 620*c*.

Consequently, each AND gate of the plurality of AND gates 601-603 receives two inputs and has a single output. The output logic state of the AND gate is determined by an AND logic of the inputs. If, for each AND gate of the plurality of AND gates 601-603, the first 620*a/b/c* and second inputs 622*a/b/c* are both set to high logic value (e.g., Boolean values of '1'), then the AND gate outputs a high logic value. If, however, one of the inputs to the AND gate is at a low logic value, or if both inputs are 'low', then the AND gate output a low logic value.

To illustrate the circuit operation, a specific example is depicted in FIG. 6 in which the first mask bus 522*a* coupled to the first logic gate 601 is at a logic high (e.g., Boolean value of '1'), whereas the first mask bus 522*b* coupled to the second logic gate 602 and first mask bus 522*c* coupled to the third logic gate are at a logic low (e.g., Boolean value of '0'). In this arrangement, terminal controller 516 is configured so that if the first reaction signal is transmitted, the terminal controller 516 will disable terminal 519. Conversely, because the terminal mask values for terminal 519 for the second and third reactions are set to 0 values, terminal controller 516 is configured to not disable terminal 519, even if the second and/or third reaction signals are actively being transmitted.

In this specific example, the first reaction has been triggered as illustrated by the value of '1' being present on reaction bus 509. Accordingly, AND gate output 604 is at a logic high (e.g., a Boolean value '1'). AND gate output 605 and AND gate output 606 is at a logic low (e.g., a Boolean value '0').

Each terminal controller includes an OR gate 607 that receives first through $n^{th}$ inputs from first through $n^{th}$ plurality of AND gates 604-606. The OR gate 607 has a single output. If any of the inputs to the OR gate are high logic value, then the OR gate 608 outputs a high logic value. Otherwise the OR gate 607 outputs a low logic value.

The OR gate 607 output is received by a data selector (e.g., for example, a multiplexer), which selects between a default operational input signal, or a high-impedance input signal based on the OR gate output. Based on the selection, the multiplexer is configured to either leave terminal 519 in its default configuration (e.g., connected to an appropriate signal line to receive its default operational input signal) or to disable terminal 519 (e.g., by disconnecting terminal 519 or otherwise connecting to a high impedance). If the OR gate 607 output is logic low, for example, the multiplexer 609 leaves terminal 519 in its default operation state in which operational signals are transmitted to terminal 519. Conversely, if the OR gate 607 output is logic high, however, the multiplexer is configured to connect terminal 519 to a high-impedance, thereby disabling the operation of terminal 519.

In the specific example depicted in FIG. 6, AND gate output 604 is logic high. AND gate output 605 and AND gate output 606 are each logic low. Consequently, OR gate 607 outputs a logic high (e.g., second logic state; high '1') to a multiplexer 609 by way of an OR gate output bus 608 coupled to the multiplexer 609.

The multiplexer 609 is further coupled to an operational input signal bus 611 configured to transmit a default operational input signal, and a high-impedance input source 610 configured to transmit a high-impedance input signal 610 (e.g., Z). In this example, because the OR gate output bus 608 is logic high, the multiplexer 609 selects the high-impedance input signal. Accordingly, the multiplexer 609 does not forward the default operational input signal to the first terminal 519, and the first terminal 519 is disabled.

Accordingly, in the event of the occurrence of the first reaction received by the first AND gate 601 by way of the first reaction bus 509, and the first terminal mask value received by the first AND gate 601 by way of the first terminal mask bus 522*a*, the selective safe-stating control system 600 enables safe-stating (e.g., disablement) of the first terminal 519. However, in the event of the occurrence of just the second reaction, or the third reaction, or both the second and third reaction, the first terminal 519 is not impacted (e.g., not disabled). This is because, regardless of the logic state (e.g., high or low) of the second reaction bus 510 and third reaction bus 511, the terminal mask value received by the second AND gate 602 and third AND gate 603 is logic low '0,' in the depicted example. Accordingly, the AND gate logic parameters for the second and third reactions are not met, and the second AND gate output 605 and third AND gate output 606 are logic low '0' (e.g., 'normal operation'). The second and third AND gate outputs 605-606 are ORed by the OR gate 607, which outputs a logic low to the multiplexer 609. The multiplexer 609 would then select and forward the default operational input signal to the first terminal 519, enabling continued normal operation.

Accordingly, the selective safe-stating control system 600 enables selective safe-stating of the first terminal 519. Those of ordinary skill in the art will understand that the principles of the selective safe-stating control system 600 described above are applicable to any number of terminals, terminal controllers, OR gates, AND gates, fault buses, terminal mask buses, terminal masks, and reactions.

Figure 7:
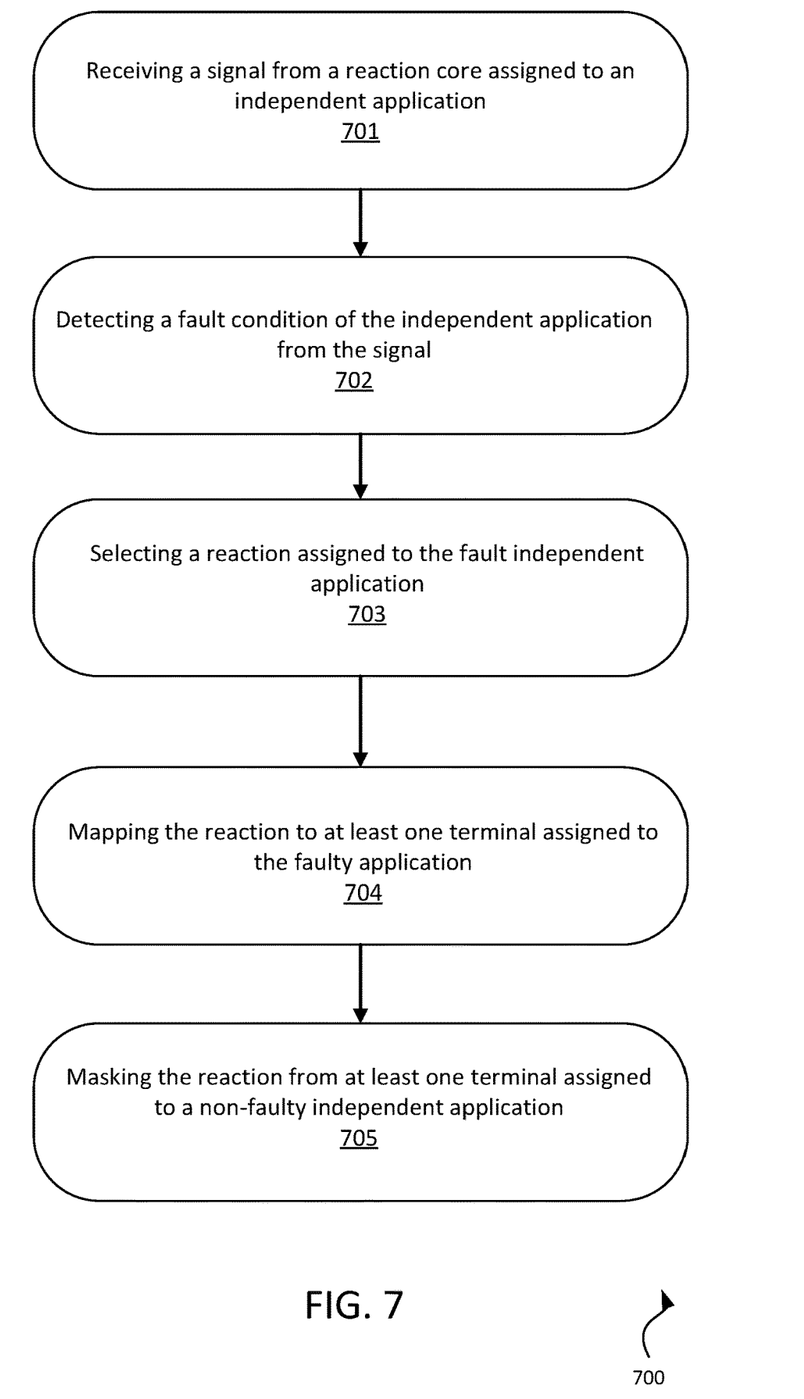
FIG. 7 is a flow chart that illustrates a selective safe-stating method implemented in the SoC of FIG. 5.

FIG. 7 is a flow chart that illustrates a selective safe-stating method 700 implemented in the SoC of FIG. 5. At step 701, the method 700 includes receiving, in an SoC, a signal from a reaction core assigned to an independent application. The receiving step 701 may comprise receiving a first fault indication from the reaction core, the reaction core being configured to transmit the first fault indication in response to an error in the independent application.

At step 702, the method 700 includes detecting, in the SoC, a fault condition of the independent application from the signal. The detecting step 702 may comprise determining, based on the fault condition and a first terminal mask in a plurality of terminal masks, whether a terminal assigned to the independent application is to be disabled. The first terminal mask may correspond to the first fault indication and identify a first subset of terminals. The first terminal mask may include a first array having a number of values equal to a number of terminals in a plurality of terminals.

Each value in the first array is associated with a terminal of the plurality of terminals. The values in the first array that are associated with terminals in a first subset of terminals have a first Boolean value and values in the first array that are associated with terminals that are not in the first subset of terminals have a second Boolean value. Each terminal in the plurality of terminals is assigned to a terminal controller in a plurality of terminal controllers, wherein each terminal controller in the plurality of terminal controllers includes a first input configured to receive an input from the first terminal mask and a second input configured to receive the signal indicative of the first fault condition.

At step 703, the method 700 includes selecting, in the SoC, a reaction assigned to the independent application having the fault condition.

At step 704, the method 700 includes mapping, in the SoC, the reaction to at least one terminal assigned to the independent application having the fault condition, wherein the mapping is configured to safe-state the at least one terminal assigned to independent application having the fault condition. The mapping step 704 may comprise disabling the terminal assigned to the independent application having the fault condition when the first input is set to the first Boolean value and the second input receives the signal.

At step 705, the method 700 includes masking, in the SoC, the reaction from at least one terminal assigned to a non-faulty independent application.

In some aspects, the techniques described herein relate to a system-on-chip (SoC), including: a plurality of terminals; a plurality of terminal controllers, each terminal controller in the plurality of terminal controllers being configured to selectively disable a terminal of the plurality of terminals; a plurality of processor cores configured to execute a plurality of applications, wherein each application of the plurality of applications is configured to transmit signals to different subsets of the plurality of terminals; a memory configured to store a plurality of terminal masks, wherein each terminal mask in the plurality of terminal masks is associated with a fault indication and identifies a subset of the plurality of terminals to be disabled; and a fault collection and reaction system coupled to the plurality of processor cores, wherein the fault collection and reaction system includes: a plurality of reaction cores, wherein each reaction core of the plurality of reaction cores corresponds to an application of the plurality of applications, each reaction core being configured to transmit a fault indication in response to an error in the corresponding application; and a controller configured to: receive a first fault indication from a first reaction core of the plurality of reaction cores; transmit a first signal indicative of a first fault condition to the plurality of terminal controllers, wherein each terminal controller is further configured to: determine, based on the first fault condition and a first terminal mask in the plurality of terminal masks, whether the terminal corresponding to the terminal controller is to be disabled, wherein the first terminal mask corresponds to the first fault condition and identifies a first subset of terminals, and when the terminal corresponding to the terminal controller is to be disabled, disable the terminal.

In some aspects, the techniques described herein relate to a system-on-chip (SoC), including: a plurality of terminals; a plurality of terminal controllers, each terminal controller in the plurality of terminal controllers being configured to selectively disable a terminal of the plurality of terminals; a plurality of processor cores configured to execute a plurality of applications, wherein each application of the plurality of applications is configured to transmit signals to different subsets of the plurality of terminals; and a fault collection and reaction system configured to: determine a first fault indication for a first application of the plurality of applications, and responsive to the first fault indication, transmit a signal indicative of a first fault condition to terminal controllers of the plurality of terminal controllers to disable an operation of a first subset of terminals, wherein the first application is configured to transmit signals to the first subset of the plurality of terminals.

In some aspects, the techniques described herein relate to a method, including: receiving, in an SoC, a signal from a reaction core assigned to an independent application; detecting, in the SoC, a fault condition of the independent application from the signal; selecting, in the SoC, a reaction assigned to the independent application having the fault condition; mapping, in the SoC, the reaction to at least one terminal assigned to the independent application having the fault condition, wherein the mapping is configured to safe-state the at least one terminal assigned to independent application having the fault condition; and masking, in the SoC, the reaction from at least one terminal assigned to a non-faulty independent application.

Although the examples have been described with reference to fault collection and reaction systems, the systems and methods described herein may be implemented in conjunction with other types of fault collection and reaction systems and methods.

The preceding detailed description is merely illustrative in nature and is not intended to limit the embodiments of the subject matter or the application and uses of such embodiments.

As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system-on-chip (SoC), comprising:
   a plurality of terminals;
   a plurality of terminal controllers, each terminal controller in the plurality of terminal controllers being configured to selectively disable a terminal of the plurality of terminals;
   a plurality of processor cores, wherein each processor core is configured to execute at least one application;
   a memory configured to store a plurality of terminal masks, wherein each terminal mask in the plurality of terminal masks is associated with a reaction core and identifies a subset of the plurality of terminals to be disabled; and
   a fault collection and reaction system coupled to the plurality of processor cores, wherein the fault collection and reaction system includes:
     a plurality of reaction cores, wherein each reaction core of the plurality of reaction cores is configured to transmit a fault indication signal in response to an error in a corresponding application; and
     a controller configured to:
       receive a first fault indication signal from a first reaction core of the plurality of reaction cores;
       transmit the first fault indication signal to the plurality of terminal controllers, wherein each terminal controller is further configured to:
         determine, based on the first fault indication signal and a value in a first terminal mask, whether the terminal corresponding to the terminal controller is to be disabled, wherein the first terminal mask is associated with the first reaction core, and
         when the terminal corresponding to the terminal controller is to be disabled, disable the terminal.

2. The SoC of claim 1, wherein the first terminal mask includes a first array having a number of values equal to a number of terminals in the plurality of terminals, wherein each value in the first array is associated with a terminal of the plurality of terminals.

3. The SoC of claim 2, wherein values in the first array that are associated with terminals in a first subset of terminals have a first Boolean value and values in the first array that are associated with terminals that are not in the first subset of terminals have a second Boolean value.

4. The SoC of claim 3, wherein each terminal controller in the plurality of terminal controllers includes a first input configured to receive an input from the first terminal mask and a second input configured to receive the first signal indicative of the first fault indication.

5. The SoC of claim 1, wherein the controller is configured to:
   receive a second fault indication signal from a second reaction core of the plurality of reaction cores; and
   transmit the second fault indication signal to the plurality of terminal controllers, wherein each terminal controller is further configured to:
     determine, based on the second fault indication signal and a value in a second terminal mask, whether the terminal corresponding to the terminal controller is to be disabled, wherein the second terminal mask is associated with the second reaction core, and
     when the terminal corresponding to the terminal controller is to be disabled, disable the terminal.

6. The SoC of claim 1, wherein the plurality of terminals includes signal pins, contact pads, and/or solder balls.

7. A system-on-chip (SoC), comprising:
   a plurality of terminals;
   a plurality of terminal controllers, each terminal controller in the plurality of terminal controllers being configured to selectively disable a terminal of the plurality of terminals;
   a processor configured to execute a plurality of applications; and
   a fault collection and reaction system configured to:

detect a first fault indication for a first application of the plurality of applications, and responsive to the first fault indication, transmit a first signal indicative of the first fault indication to the plurality of terminal controllers to disable an operation of a first subset of the plurality of terminals, wherein the first subset includes terminals that are used by the first application and the first subset does not include terminals that are not used by the first application; and a memory configured to store a plurality of terminal masks including a first terminal mask that is associated with the first fault indication and identifies the first subset of the plurality of terminals to be disabled.

8. The SoC of claim 7, wherein the first terminal mask includes a first array having a number of values equal to a number of terminals in the plurality of terminals, wherein each value in the first array is associated with a terminal of the plurality of terminals.

9. The SoC of claim 8, wherein values in the first array that are associated with terminals in the first subset of terminals have a first Boolean value and values in the first array that are associated with terminals that are not in the first subset of terminals have a second Boolean value.

10. The SoC of claim 9, wherein each terminal controller in the plurality of terminal controllers includes a first input configured to receive a first value from the first terminal mask and a second input configured to receive the first signal indicative of the first fault indication.

11. The SoC of claim 10, wherein each terminal controller is configured to disable the terminal associated with the terminal controller when the first input is set to the first Boolean value and the second input receives the first signal.

12. The SoC of claim 11, wherein the controller is configured to:

detect a second fault indication for a second application of the plurality of applications, and responsive to the second fault indication, transmit a second signal indicative of the second fault indication to the plurality of terminal controllers to disable an operation of a second subset of the plurality of terminals, wherein the second subset includes terminals that are used by the second application and the second subset does not include terminals that are not used by the second application.

13. The SoC of claim 12, wherein the memory includes a second terminal mask that is associated with the second fault indication and identifies the second subset of the plurality of terminals to be disabled, the second terminal mask including a second array having a second number of values equal to the number of terminals in the plurality of terminals, wherein each value in the first array is associated with a terminal of the plurality of terminals.

14. The SoC of claim 13, wherein values in the second array that are associated with terminals in the second subset of terminals have the first Boolean value and values in the second array that are associated with terminals that are not in the second subset of terminals have the second Boolean value.

15. The SoC of claim 14, wherein each terminal controller in the plurality of terminal controllers includes a third input configured to receive a second value from the second terminal mask and a fourth input configured to receive the second signal indicative of the second fault indication.

16. The SoC of claim 15, wherein each terminal controller is configured to disable the terminal associated with the terminal controller when the third input is set to the first Boolean value and the fourth input receives the second signal.

17. The SoC of claim 7, wherein the plurality of terminals includes one or more of signal pins, contact pads, and solder balls.

18. A method, comprising:

receiving a signal from a reaction core indicating a fault in a first application executed by a processor;

accessing a memory which stores a plurality of terminal masks including a first terminal mask that is associated with the fault and identifies a first subset of the plurality of terminals to be disabled; and disabling the first subset of the plurality of terminals based on the first terminal mask, wherein the first subset of the plurality of terminals includes terminals used by the first application and does not include terminals that are not used by the first application.

19. The method of claim 18, wherein disabling the first subset of the plurality of terminals includes transmitting, to a plurality of terminal controllers, a signal indicative of the first fault in the first application, wherein each terminal controller in the plurality of terminal controllers is configured to selectively disable a terminal of the plurality of terminals.

* * * * *